United States Patent

Yanagidaira et al.

[15] 3,674,996

[45] July 4, 1972

[54] CONVERSION SYSTEM USING A CONVERSION TABLE

[72] Inventors: Hidetaka Yanagidaira, Ohmiya; Kazuo Kawai; Sotokichi Shintani, both of Tokyo-to, all of Japan

[73] Assignee: Kokusai Denshin Denwa Kabushiki Kaisha, Tokyo-to, Japan

[22] Filed: Sept. 8, 1970

[21] Appl. No.: 70,403

[30] Foreign Application Priority Data

Sept. 12, 1969 Japan....................................44/72461

[52] U.S. Cl............................235/154, 235/155, 340/172.5, 340/347 DD

[51] Int. Cl...........................................................H04l 3/00

[58] Field of Search............340/347 DD; 235/154, 155, 189, 235/150.26

[56] References Cited

UNITED STATES PATENTS 3,400,375 9/1968 Bowling..............................340/172.5

3,354,450 11/1967 Carthew .............................340/172.5

*Primary Examiner*—Thomas A. Robinson
*Assistant Examiner*—Jeremiah Glassman
*Attorney*—Robert E. Burns and Emmanuel J. Lobato

[57] ABSTRACT

A conversion system for converting input information indicated by at least two input code units to output information indicated by at least two output code units by the use of a conversion table, in which the two input code units are shifted before application to the conversion table in the direction to upper digits until the most significant digit of a code unit indicative of an absolute value of one of the two input code units assumes one of two possible states of binary information so that the most significant digit of the two input code units applied to the conversion table do not at all assume the other of two possible states of binary information. Particular combinations of the two input code units having a condition in which a particular one of the two input code units is larger than the other may be excluded by exchanging the two input code units for each other.

5 Claims, 10 Drawing Figures

CONVERSION SYSTEM USING A CONVERSION TABLE

This invention relates to a signal conversion system using a conversion table.

There have been heretofore used in the arts many coordinates systems, such as rectangular coordinates, polar coordinates, rectangular hyperbolic coordinates, parabolic coordinates, elliptic coordinates, etc. Moreover, mutual conversion between two of these coordinates systems are frequently performed. In a case where the above-mentioned conversion is performed by the use of coded digital information, this conversion can be carried out by numerical operation. However, if division and/or evolution are/is necessary in the numerical operation, high speed operation is usually difficult. Accordingly, the conversion are frequently performed by the use of a conversion table, which has all the necessary combinations of two variables. However, capacity of the conversion table has to be raised up in accordance with increase of the number of bits necessary for representing two variables.

An object of this invention is to provide a signal conversion system capable of performing mutual conversion between two coordinates systems without use of a conversion table of so large scale.

In accordance with the principle of this invention, a necessary conversion table of this invention is formed by excluding inhibitory combinations from combinations of bits of two variables by the use of symmetry and orthogonality of coordinates.

The principle, construction and operation of the system of this invention will be better understood from the following detailed discussion in conjunction with the accompanying drawings, in which.

Figure 1:
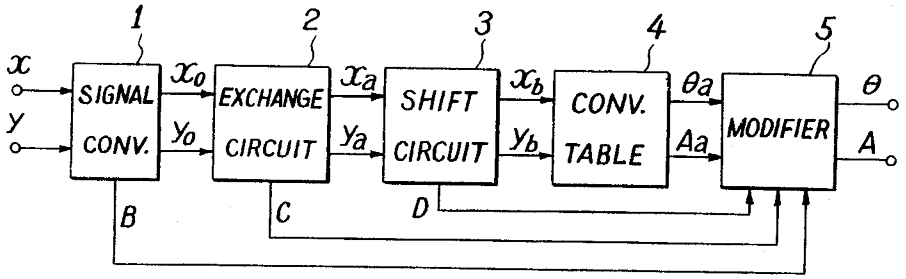
FIG. 1 is a block diagram illustrating an embodiment of this invention.
Figure 4A:
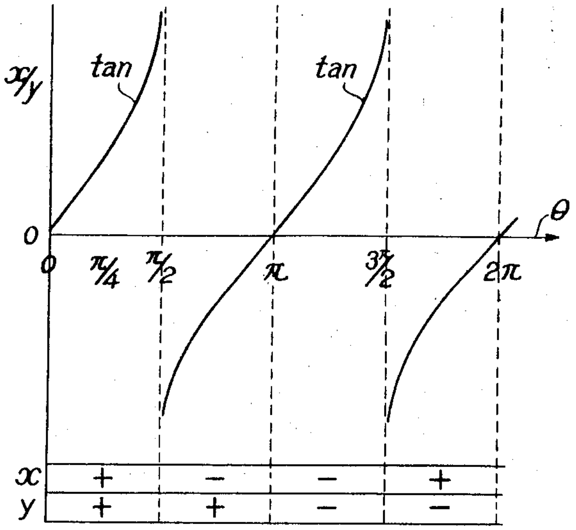
FIGS. 4A, 4B, 4C, 5 and 7 are respectively characteristic curves explanatory of the operations of the system of this invention.
Figure 4B:
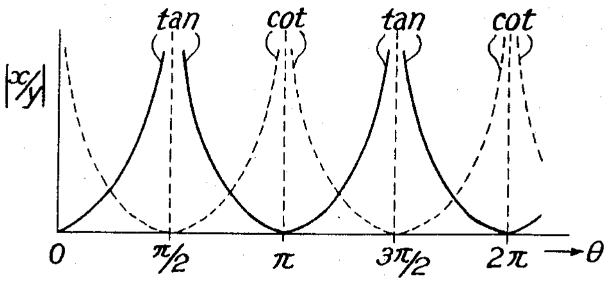

With reference to FIG. 1, an embodiment of this invention applied to convert rectangular coordinates to polar coodinates comprises input terminals for input coded signals $x$ and $y$, a signal converter 1, an exchange circuit 2, a shift circuit 3, a conversion table 4, a modifier 5 and output terminals for output coded signals $\theta$ and A. In this conversion system, input coded signals $x = A \sin\theta$ and $y = A \cos\theta$ are converted to output coded signals $\theta = \tan^{-1} x/y$ and A= $x^2+y^2$. In this case, a value $\tan\theta = x/y$ necessary to obtain the output coded signal $\theta = \tan^{-1} x/y$ varies as shown in FIG. 4A in accordance with positive or negative of the input coded signals $x$ and $y$. In view of this condition, the input coded signals $x$ and $y$ are respectively converted, in the signal converter 1, to code unit $x_o$ and $y_o$ indicative of respective absolute values of the input coded signals $x$ and $y$. If code configuration of the coded signals $x$ and $y$ is "a folded binary code," the most significant digit indicative of the polarity of the code unit (i.e.; sign digit) is eliminated. Since code unit $x_o$ and $y_o$ assume positive values only due to the above conversion, a conversion table handling negative values is not necessary. Sign digits of the input coded signals $x$ and $y$ are applied through a connection line B to the modifier 5. Accordingly, a value $\tan\theta = x/y$ of this case assumes values shown in FIG. 4B by solid lines. Thus code unit $x_o$ and $y_o$ indicative of respective absolute values are applied to the exchange circuit 2, in which exchange for these code units $x_o$ and $y_o$ are performed.

Figure 2:
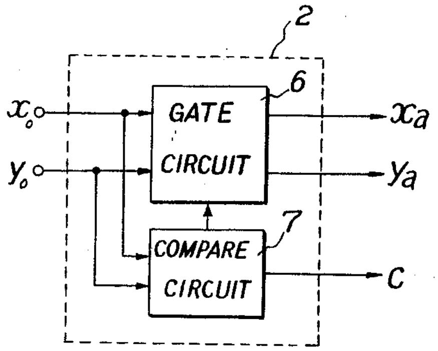
FIG. 2 is a block diagram illustrating an example of an exchange circuit used in the embodiment shown in FIG. 1.

An example of the exchange circuit 2 comprises, as shown in FIG. 2, a gate circuit 6 and a compare circuit 7. The compare circuit 7 detects a condition where the value of the code unit $x_o$ is larger than the value of the code unit $y_o$. In this case, the gate circuit 6 is controlled by the compare circuit 7 so that the input code units $x_o$ and $y_o$ of the gate circuit 6 are respectively applied to terminals $y_a$ and $x_a$ after exchange for each other. However, if the value of the code unit $x_o$ is equal to or smaller than the value of code unit $y_o$, the gate circuit 6 is not controlled by the compare circuit so that the input code units $x_o$ and $y_o$ of the gate circuit 6 are respectively applied to terminals $x_a$ and $y_a$ without exchange. A signal indicative of the above exchange is applied from the compare circuit 7 to the modifier 5 through a connection line C.

Figure 4C:
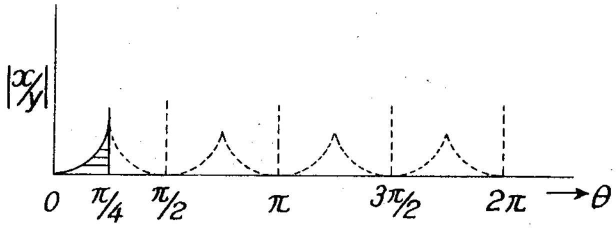

As a result of this exchange operation, a value $y/x$ (i.e.; cos $\theta$) is obtained if the value of the code unit $x_o$ is larger than the value of the code unit $y_o$. However, a necessary conversion table can be reduced to a capacity for combinations, in which the value of the code unit $x_o$ is equal to or less than the value of the code unit $y_o$, since a value $\tan^{-1} x/y$ can be obtained from a value $\tan^{-1} y/x$ in view of a relationship : $\tan^{-1} x/y = (\pi/2) - \tan^{-1} y/x$. Accordingly, a necessary conversion table can be reduced to a capacity for a small region 0 to $\pi/4$ shown by hatching in FIG. 4C after conversion in the signal converter 1 and exchange in the exchange circuit 2.

Figure 3A:
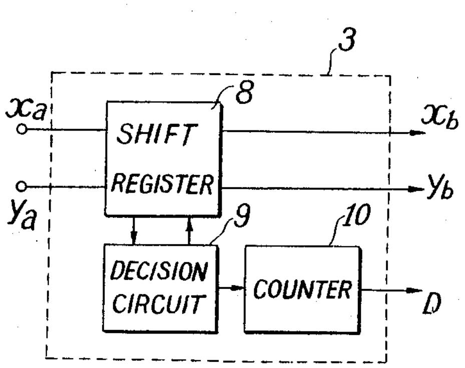
FIGS. 3A and 3B are respectively examples of a shift circuit used in the embodiment shown in FIG. 1.

The outputs $x_a$ and $y_a$ of the exchange circuit 2 are applied to the shift circuit 3. This shift circuit 3 comprises, as shown in FIG. 3A, a shift register 8, a decision circuit 9 and a counter 10 by way of example. The shift register 8 shifts, by one bit, the code units $x_a$ and $y_a$ under control of the decision circuit 9 and sends out output code units $x_b$ and $y_b$. The decision circuit 9 detects whether or not the most significant digits of both the code units $x_a$ and $y_a$ stored in the shift register 8 assume the state "0." If the most significant digits of both the code units $x_a$ and $y_a$ assume the state "0," the contents of the shift register 8 are shifted by one bit in response to the output of the decision circuit 9. This decision circuit 9 repeatedly performs the above decision operation for the shifted contents ($x_a$ and $y_a$). The above shifts are repeated until any of the most significant digits of the code units $x_a$ and $y_a$ becomes the state "1." The counter 10 counts the number of shifts performed by the shift register 8 and applies, through a connection line D, the number of shifted bits to the modifier 5.

Figure 3B:
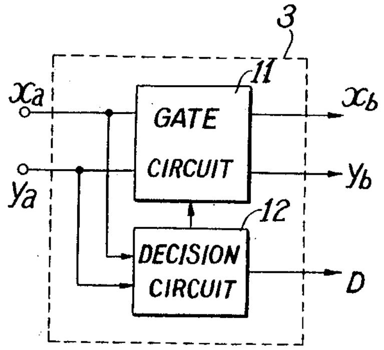

With reference to FIG. 3B, another example of the shift circuit 3 suitable for more high speed operation comprises a gate circuit 11 and a decision circuit 12. This decision circuit 12 detects the number of bits of the state "0" counted from respective most significant digits of the code units $x_a$ and $y_a$ so that the respective numbers of bits of the code units $x_a$ and $y_a$ to be shifted in the gate circuit 11 are determined. The gate circuit 11 sends out code units $x_b$ and $y_b$ shifted under control of the decision circuit 12. The decision circuit 12 applies the numbers of shifted bits to the modifier 5 through a connection line D.

As a result of the above-mentioned shift operation, the following merits are obtained. In a case where a value $\theta = \tan^{-1} x/y$ is required, a value $\theta$ is not varied even if each of the values $x$ and $y$ is multiplied by the same number since the value $\theta$ is a function of a value $x/y$. Accordingly, if both the respective most significant digits of the coded signals $x$ and $y$ assume the state "0," the coded signals $x$ and $y$ are multiplied by a value $2^k$ to shift by $k$-bits, where "$k$" is an integer. Accordingly, the most significant digit of at least either the value $x$ or $y$ becomes the state "0," so that combinations of the coded signals $x$ and $y$ in which both the respective most significant digits of the coded signals $x$ and $y$ assume the state "0" can be effectively excluded. Moreover, in a case where data of the coded signals $x$ and $y$ are determined by rounding off (counting fractions of five and over as a unit and disregard the rest; or raising or neglecting their end parts) detailed data of a number of bits to reduce necessary bits, preciseness of this determination can be raised by taking a rounded-off figure down in view of the above-mentioned shifting. However, in a case where a value A $= \sqrt{x^2+y^2}$ is to be converted, a value A is also multiplied by a value $2^k$ since both coded signals $x$ and $y$ are multiplied by the value A. Accordingly, a required value is obtained by dividing an obtained result by a value $2^k$ (i.e.; by reversely shifting $k$-bits). To perform this reverse shifting, information indicative of the number of shifted bits is sent out from the shift circuit 3 to the modifier 5 through a connection line C.

Figure 5:
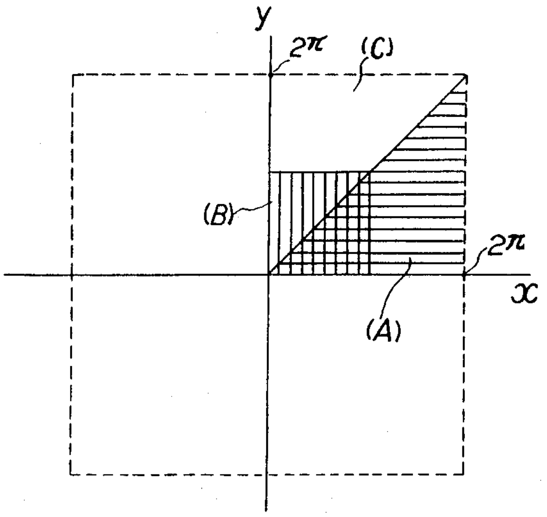

The code units $x_b$ and $y_b$ obtained from the shift circuit 3 are applied to the conversion table 4. Since the number of combinations of the code units $x_b$ and $y_b$ is effectively reduced by the above-mentioned exclusion of inhibitory combinations and exchange of data, the conversion table may be designed so as to be suitable for a reduced capacity. If this invention is not applied thereto, a conversion table having a capacity shown by an enclosure of dotted line in FIG. 5 is necessary. In this invention, however, the number of combinations of values $x$ and $y$ corresponding to a value $\theta$ of a range 0 to $2\pi$ is reduced to that corresponding to a region 0 to $\pi/4$ by alternately using a value $\tan^{-1} y/x$ and a value $\tan^{-1} x/y$ in view of positive and negative polarities of the coded signals $x$ and $y$ and in view of the compare result of respective absolute values $x_o$ and $y_o$ of the coded signals $x$ and $y$. Accordingly, since combinations of values x and y included in an area (A) shown by lateral hatching in FIG. 5 are excluded by the above-mentioned exchange, and since combinations of values $x$ and $y$ included in an area (B) shown by vertical hatching in FIG. 5 are excluded by the above-mentioned shift, the capacity of the conversion table 4 is sufficient for covering only an area (C) in FIG. 5. This conversion table 4 is so designed that each of values $\theta_a$ and $A_a$ is uniquely determined in accordance with a combination of applied code units $x_b$ and $y_b$.

The converted values $\theta_a$ and $A_a$ are applied to the modifier 5. In this modifier 5, values $\theta$ and A are generated by the use of the applied code units $\theta_a$ and $A_a$. In this case, the applied code unit $\theta_a$ is transferred to the code unit $\theta$ as it is if the exchange information is not applied from the exchange circuit 2 through the connection line C, while the applied code unit $\theta_a$ is transferred to the code unit $\theta$ $(=(\pi/2)-\theta_a)$ if the exchange information is applied from the exchange circuit 2 through the connection line C. Moreover, the applied code unit $\theta_a$ is modified so as to add zero or $\pi/2$ in accordance with combinations of polarities of the coded signals $x$ and $y$ shown in FIG. 4A. On the other hand, the applied code unit $A_a$ is modified by reversely shifting in accordance with shift information applied from the shift circuit 3 through the connection line D.

The above-mentioned inhibited combinations of code units $x_o$ and $y_o$ each indicated by three bits are shown in Table 1.

TABLE 1

| (I) | (III) $x_o$ | (III) $y_o$ | (I) | (II) | (III) $x_o$ | (III) $y_o$ |
|---|---|---|---|---|---|---|
| | 000 | 000 | | * | 100 | 000 |
| | *000 | 001 | | * | 100 | 001 |
| | *000 | 010 | | * | 100 | 010 |
| | *000 | 011 | | * | 100 | 011 |
| | 000 | 100 | | | 100 | 100 |
| | 000 | 101 | | | 100 | 101 |
| | 000 | 110 | | | 100 | 110 |
| | 000 | 111 | | | 100 | 111 |
| * | *001 | 000 | | * | 101 | 000 |
| | *001 | 001 | | * | 101 | 001 |
| | *001 | 010 | | * | 101 | 010 |
| | *001 | 011 | | * | 101 | 011 |
| | 001 | 100 | | * | 101 | 100 |
| | 001 | 101 | | | 101 | 101 |
| | 001 | 110 | | | 101 | 110 |
| | 001 | 111 | | | 101 | 111 |
| * | *010 | 000 | | * | 110 | 000 |
| * | *010 | 001 | | * | 110 | 001 |
| | *010 | 010 | | * | 110 | 010 |
| | *010 | 011 | | * | 110 | 011 |
| | 010 | 100 | | * | 110 | 100 |
| | 010 | 101 | | * | 110 | 101 |
| | 010 | 110 | | | 110 | 110 |
| | 010 | 111 | | | 110 | 111 |
| * | *011 | 000 | | * | 111 | 000 |
| * | *011 | 001 | | * | 111 | 001 |
| * | *011 | 010 | | * | 111 | 010 |
| | *011 | 011 | | * | 111 | 011 |
| | 011 | 100 | | * | 111 | 100 |
| | 011 | 101 | | * | 111 | 101 |
| | 011 | 110 | | * | 111 | 110 |
| | 011 | 111 | | | 111 | 111 |

In this Table 1, marks (*) designated in a column (I) show inhibitory combinations by shift, while marks (*) designated in columns (II) show inhibitory combinations by exchange. Input code units $x_o$ and $y_o$ are shown in columns (III). In a case where each of the input code units $x_o$ and $y_o$ are indicated by $n$-bits, the number of inhibitory combinations of the code units $x_o$ and $y_o$, having a condition where the code unit $x_o$ is larger than the code unit $y_o$, and excluded by exchange is equal to a number $(2^{2n-1} - 2^{n-1})$. On the other hand, the number of inhibitory combinations of the code units $x_o$ and $y_o$ excluded by shift is equal to a number $2^{2n-2}$. Since parts of these numbers are overlapped as shown in FIG. 5, a total number of inhibitory combinations is ultimately equal to a number $(2^{2n-3} + 2^{2n-2} - 2^{n-2})$. Respective numbers of inhibitory combinations and other data for the number $n$ of bits and respective total numbers of combinations are shown in Table 2. Respective percents of the numbers of inhibitory combinations to respective total number of combinations are shown at a column (V). Since each of the input coded signals $x$ and $y$ has a sign bit in addition to the code unit $x_o$ or $y_o$ of $n$-bits, actual reduction percents are indicated in a column (VI) of Table 2.

TABLE 2

| n | (I) | (II) | (III) | (IV) | (V) % | (IV) % |
|---|---|---|---|---|---|---|
| 3 | 64 | 16 | 22 | 38 | 59.4 | 14.85 |
| 4 | 256 | 64 | 92 | 156 | 60.9 | 15.225 |
| 5 | 1024 | 256 | 376 | 632 | 61.7 | 15.425 |
| 6 | 4096 | 1024 | 1520 | 2544 | 62.1 | 15.525 |
| 7 | 16384 | 4096 | 6112 | 10208 | 62.3 | 15.57 |
| 0 | . | . | . | . | . | . |
| . | . | . | . | . | . | . |
| . | . | . | . | . | . | . |
| ∞ | | | | | 62.5 | 15.625 |

In the Table 2, columns (I), (II), (III) and (IV) are respectively "total number of combinations," "inhibitory number of combination excluded by shift," "inhibitory number of combinations excluded by exchange" and "total inhibitory number of combination."

Figure 6:
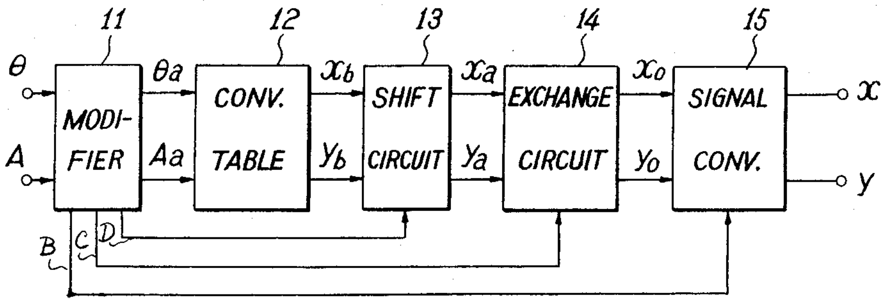
FIG. 6 is a block diagram illustrating another embodiment of this invention.

Another embodiment of this invention in which reverse conversion converting the values $\theta$ and A to the values $x$ and $y$ will be described. This embodiment comprises, as shown in FIG. 6, input terminals for receiving input coded signals $\theta$ and A indicative of a phase angle and an absolute value respectively, a modifier 11, a conversion table 12, a shift circuit 13, an exchange circuit 14, a signal converter 15 and output terminals sending out output coded signals $x$ and $y$. In this embodiment, operations are performed in the reverse order to that of the embodiment shown in FIG. 1. A code unit $\theta$ indicative of the phase angle and a code unit A indicative of the absolute value are applied to the modifier 11. This modifier 11 detects a quadrant in which the information to be converted is included. If the phase angle corresponding to the code unit $\theta$ is more than an angle $\pi/2$, an integer multiple of the angle $\pi/2$ is subtracted from the phase angle so that the phase angle is converted to a first modified value included in a region zero to $\pi/2$. In this case, first modifying information indicative of the number of the above subtractions of the unit angle $\pi/2$ is transferred to the signal converter 15 through a connection line B. Moreover, the modifier 11 detects whether or not the first modified value is more than a value $\pi/4$. If the first modified value is more than the value $\pi/4$, the first modified value is subtracted from a value $\pi/2$ so as to modify the first modified value to a second modified value which is less than the value $\pi/4$. In this case, second modifying information indicative of the above subtraction of the value $\pi/4$ is transferred to the exchange circuit 14 through a connection line C. On the other hand, the code unit A indicative of the absolute value is shifted in the direction toward higher digits until a shifted value of the code unit A is included in the operable range of the conversion table 12. In this case, the number of shifted bits is transferred to the shift circuit 13 through a connection line D. Code units $\theta_a$ and $A_a$ modified as mentioned above are applied to the conversion table 12 having the same operatable range as the conversion table 4, so that the modified code units $\theta_a$ and $A_a$ are converted to code units $x_b$ and $y_b$. These code units $x_b$ and $y_b$ indicate respectively one and the other of orthogonal components of input information to be reversely converted. The converted code units $x_b$ and $y_b$ are applied to the shift circuit 13, in which the converted code units $x_b$ and $y_b$ are reversely shifted by the number of bits transferred through the connection line D. Accordingly, code units $x_a$ and $y_a$ indicative of an absolute value proportional to the input information are obtained at the output of the shift circuit 13. These code units $x_a$ and $y_a$ are then applied to the exchange circuit 14, in which these code units $x_a$ and $y_a$ are again substracted from the value $\pi/2$ under control of the second modified information applied through the connection line C. As a result of this operation, the code units $x_a$ and $y_a$ are converted to code units $x_o$ and $y_o$ covering a range zero to $\pi/2$. These code units $x_o$ and $y_o$ are applied to the signal converter 15, in which the code units $x_o$ and $y_o$ are converted to output code units $x$ and $y$ by adding a sign digit under control of the first modified information applied through the line B. of course, the output code units $x$ and $y$ cover all the range 0 to $2\pi$.

As mentioned above, the operations of this embodiment shown in FIG. 6 is completely reverse to the operations of the embodiment shown in FIG. 1. Moreover, this reverse operation can be also performed by the use of a conversion table of small capacity.

Figure 7:
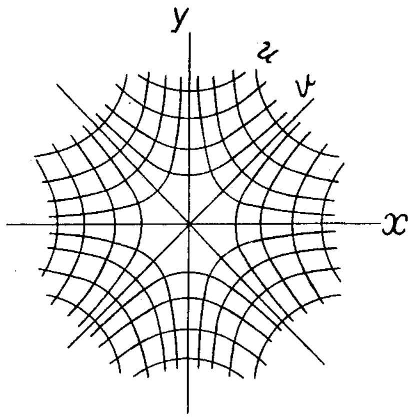

The above explanation relates to mutual conversion between rectangular coordinates and polar coordinates. However, this invention can be applied to conversion between other orthogonal curvilinear coordinates. By way of example, conversion between rectangular hyperbolic coordinates and polar coordinates will be described. In the rectangular hyperbolic coordinates, four quadrants are symmetrical to one another as shown in FIG. 7. Moreover, one of the four quadrants is symmetrical with respect to an axis ($x=\pm y$). Accordingly, a minimum capacity necessary for this conversion is that designed for one half the quadrant, while conversion for remainders of the four quadrants is performed in modifying under such principle as mentioned above. In this case, the above-mentioned shift corresponding to exchange operation can be also utilized. Accordingly, this conversion can be performed by the same construction as shown in FIG. 1. However, input code units of this case are not the coded signals $x$ and $y$ but coded signals $u$ and $v$ indicative of a position on the rectangular hyperbolic coordinates, while the conversion table is designed to convert the rectangular hyperbolic coordinates to the polar coordinates. Output code units of this conversion are code units $x$ and $y$ instead of the codes $\theta$ and A.

The above explanation relates to mutual conversion between one to another of plane coordinates. However, this invention can be applied to mutual conversion between one and another of three-dimensional coordinates or of poly-dimensional coordinates. As understood from the above description, miniaturizing effect of the conversion table formed in accordance with this invention is raised in proportion to increase of the number of dimensions of coordinates.

As mentioned above in detail, mutual conversion between one and another of many kinds of coordinate systems can be performed by the use of a simplified conversion table of this invention while utilizing the above-mentioned shift and exchange. Accordingly, this invention can produce excellent merits in the field of data processing.

What we claim is:

1. A conversion system comprising conversion means for converting input information indicated by at least two digital input code units to output information indicated by at least two output code units, input means for applying said input code units to said conversion means, said input means including shift circuit means for shifting the two input code units in the direction toward higher digits until the most significant digit indicative of an absolute value of either one of the two input code units assumes a predetermined one of two possible states of binary information, and for subsequently applying said shifted input code units to said conversion means so that the said most significant digits of the two input code units applied to the conversion means never simultaneously assume the other of said two possible states of binary information, whereby the required capacity of said conversion means is effectively reduced.

2. A conversion system according to claim 1, in which said input means further includes a decision circuit for detecting a predetermined condition where the most significant digit of a code unit indicative of an absolute value of one of the two input code units assumes said one of two possible states of binary information, and said shift means includes a shift register for shifting the two input code units in the direction toward higher digits until said decision circuit detects said predetermined condition.

3. A conversion system according to claim 1 in which said input means further includes a decision circuit for detecting the number of digits of said other of two possible states of binary information counted from the respective most significant digits of the two input code units and gate circuit means for gating the two input code units after shifting by the number of digits detected by said decision circuit.

4. A conversion system according to claim 1, in which said input means further includes means for exchanging said two input code units for each other so that particular combinations of the two input code units having a condition in which a particular one of the two input code units is larger than the other of the two input code units are excluded.

5. A conversion system according to claim 4, in which said exchanging means comprises comparison circuit means for detecting said particular conditions, and gate circuit means for exchanging said two input code units when said comparison circuit means detects said particular conditions.

* * * * *